(12) United States Patent
Pfeifer et al.

(10) Patent No.: US 11,206,942 B2
(45) Date of Patent: *Dec. 28, 2021

(54) VIRTUAL SIGHT GLASS FOR A PORTABLE BEVERAGE DISPENSING CONTAINER

(71) Applicant: Grindmaster Corporation, Louisville, KY (US)

(72) Inventors: Thomas Joseph Pfeifer, Louisville, KY (US); John Thomas Quesenberry, Jr., Crestwood, KY (US)

(73) Assignee: Grindmaster Corporation, Louisville, KY (US)

( * ) Notice: Subject to any disclaimer, the term of this patent is extended or adjusted under 35 U.S.C. 154(b) by 405 days.

This patent is subject to a terminal disclaimer.

(21) Appl. No.: 16/445,532

(22) Filed: Jun. 19, 2019

(65) Prior Publication Data

US 2019/0313840 A1  Oct. 17, 2019

Related U.S. Application Data

(63) Continuation-in-part of application No. 15/378,819, filed on Dec. 14, 2016, now Pat. No. 10,390,648.

(60) Provisional application No. 62/267,612, filed on Dec. 15, 2015.

(51) Int. Cl.
| | | |
|---|---|---|
| *A47J 31/00* | (2006.01) | |
| *A47J 31/52* | (2006.01) | |
| *A47J 31/46* | (2006.01) | |
| *A47J 31/44* | (2006.01) | |

(52) U.S. Cl.
CPC ............ *A47J 31/525* (2018.08); *A47J 31/005* (2013.01); *A47J 31/007* (2013.01); *A47J 31/4403* (2013.01); *A47J 31/4457* (2013.01); *A47J 31/467* (2013.01)

(58) Field of Classification Search
CPC .... A47J 31/005; A47J 31/007; A47J 31/4403; A47J 31/4457; G01F 23/02
USPC ....... 99/285, 323.3, 343; 222/158, 157, 156, 222/159, 146.2, 146.5; 73/323, 328
See application file for complete search history.

(56) References Cited

U.S. PATENT DOCUMENTS

| | | | | |
|---|---|---|---|---|
| 5,570,623 | A * | 11/1996 | Lin ......................... | A47J 31/20 99/285 |
| 6,818,866 | B2 * | 11/2004 | Gordon ................. | A47J 27/212 219/429 |
| 7,357,070 | B2 * | 4/2008 | Chan ..................... | A47J 27/212 219/429 |

(Continued)

*Primary Examiner* — Reginald Alexander
(74) *Attorney, Agent, or Firm* — Stites & Harbison, PLLC; David W. Nagle, Jr.; James R. Hayne

(57) ABSTRACT

A portable beverage dispensing container comprises a housing and an internal beverage holding tank positioned in and contained within the housing. The internal beverage holding tank is configured to receive and store a beverage, and the internal beverage holding tank is constructed from a translucent material. The housing includes an opening through a rear surface thereof, such that light from a light source (which is installed at a brewing station) can be directed through the opening and through the internal beverage holding tank, such a light pattern is projected on a sight glass window on a front surface of the housing that provides a visual indication of provide a visual indication of the level of the beverage in the shuttle, along with a visual indication of the status of the brewed beverage.

12 Claims, 7 Drawing Sheets

(56) References Cited

U.S. PATENT DOCUMENTS 10,390,648 B1 * 8/2019 Pfeifer ................ A47J 31/005

* cited by examiner

VIRTUAL SIGHT GLASS FOR A PORTABLE BEVERAGE DISPENSING CONTAINER

CROSS-REFERENCE TO RELATED APPLICATIONS

The present application is a continuation-in-part of U.S. patent application Ser. No. 15/378,819 filed on Dec. 14, 2016, which claims priority to U.S. Patent Application Ser. No. 62/267,612 filed on Dec. 15, 2015, the entire disclosures of which are incorporated herein by reference.

BACKGROUND OF THE INVENTION

In the food service industry, the prompt availability of high quality hot beverages, predominantly coffee, is a necessity. Since customers may request such hot beverages in sporadic intervals and in varying amounts throughout the day, it has become necessary to have large volumes of fresh beverage available on demand. At the same time, it is desirable to provide beverage dispensing capabilities at a number of locations throughout a restaurant or other location so that servers or other wait staff do not need to return to the brewer to retrieve a fresh beverage.

Thus, manufacturers of coffee brewers have developed satellite (or shuttle) brewing systems. In such systems, the beverage is brewed at a central brewing station, and then transported in separate and portable beverage dispensing containers (commonly referred to as shuttles) to various convenient locations at which the beverage can be dispensed for consumption either by food service personnel or the consumer. For a further discussion of satellite brewing systems, see, for example, U.S. Pat. No. 5,907,993 issued to Van Camp, et al. and U.S. Pat. No. 4,621,571 issued to Roberts.

In some such satellite brewing systems, it is often necessary for the attendants to determine the remaining volume of beverage contained within a shuttle. Thus, prior art dispensers ordinarily resort to the use of a sight glass that is in communication with the volume of the beverage. The sight glass is often positioned on the front surface of the shuttle to provide a ready visual indication of the level (or volume) of beverage that is stored in the shuttle. However, sight glasses are often fragile and may be difficult to read when residue accumulates on the sight glass. Residue from the sight glass can also contaminate future batches of the beverage. Furthermore, the sight glass provides for an avenue for heat loss; for instance, when using a sight glass, the temperature of the beverage is lowered because a portion of the beverage that is poured out into each cup comes from the portion of beverage in the sight glass.

As the foregoing description suggests, in general, heat loss can be a significant problem in satellite brewing systems. This is exacerbated by the fact that the beverage is held in the shuttle until all of the beverage has been dispensed, frequently resulting in a holding time of multiple hours.

It would thus be desirable to provide a design and construction of portable beverage dispensing container (or shuttle) of a satellite brewing system that addresses some of these deficiencies of the prior art.

SUMMARY OF THE INVENTION

The present invention is a virtual sight glass for a portable beverage dispensing container of a satellite brewing system, which provides a visual indication of the level of the beverage in the portable beverage dispensing container when it is positioned at the brewing station, along with a visual indication of the status of the brewed beverage.

An exemplary satellite brewing system made in accordance with the present invention generally comprises a brewing station and a portable beverage dispensing container (or shuttle). The shuttle is selectively positioned under a brew basket of the brewing station. The brewing station includes a water tank (or reservoir) with a heater configured to heat and maintain the water at a predetermined temperature. In use, a plumbing system of the brewing station delivers the hot water from the water tank to a spray head. The spray head then delivers the hot water to the brew basket, introducing the hot water into the brew basket, such that the hot water contacts and passes through a quantity of ground coffee, tea, or other beverage component to produce a brewed beverage, which moves downward under the force of gravity and through a filter, pod, or other media before being dispensed into the shuttle.

The shuttle includes a housing with an internal beverage holding tank (or liner) positioned in and contained within the housing. Furthermore, the shuttle includes a "virtual sight glass" that provides a visual indication of the level of the beverage in the shuttle when it is positioned at the brewing station, along with a visual indication of the status of the brewed beverage. Specifically, the brewing station includes one or more light sources, for example, light-emitting diodes (LEDs). The housing of the shuttle defines openings through a surface of the housing, which correspond to the position of the light sources. Thus, when the shuttle is positioned at the brewing station, light emitted from the light sources is directed through the openings defined through the surface of the housing of the shuttle.

The internal beverage holding tank is also constructed from a translucent plastic or similar material. Thus, light directed through the openings in the housing of the shuttle continues through the wall of the internal beverage holding tank, which contains a certain level of beverage. Light that is above the level of the beverage contained in the internal beverage holding tank will then travel through and out the other side of the internal beverage holding tank. Light that is below the level of the beverage will be substantially absorbed by the beverage.

On the front surface of the shuttle, there is a translucent sight glass window that is installed in a corresponding opening defined through the front surface of the housing of the shuttle. Since light that is above the level of the beverage has travelled through the internal beverage holding tank, while light that is below the level of the beverage has been substantially absorbed by the beverage, the result is a light pattern projected on the sight glass window that provides a visual indication of the level of the beverage in the shuttle, i.e., a lower dark region that is indicative of the level of the beverage in the internal beverage holding tank and an upper light region that is indicative of the unfilled portion of the internal beverage holding tank. Furthermore, the color of the light pattern can be used to provide a visual indication of the status of the brewed beverage.

DETAILED DESCRIPTION OF THE INVENTION

The present invention is a virtual sight glass for a portable beverage dispensing container of a satellite brewing system, which provides a visual indication of the level of the beverage in the portable beverage dispensing container when it is positioned at the brewing station, along with a visual indication of the status of the brewed beverage.

Figure 1:
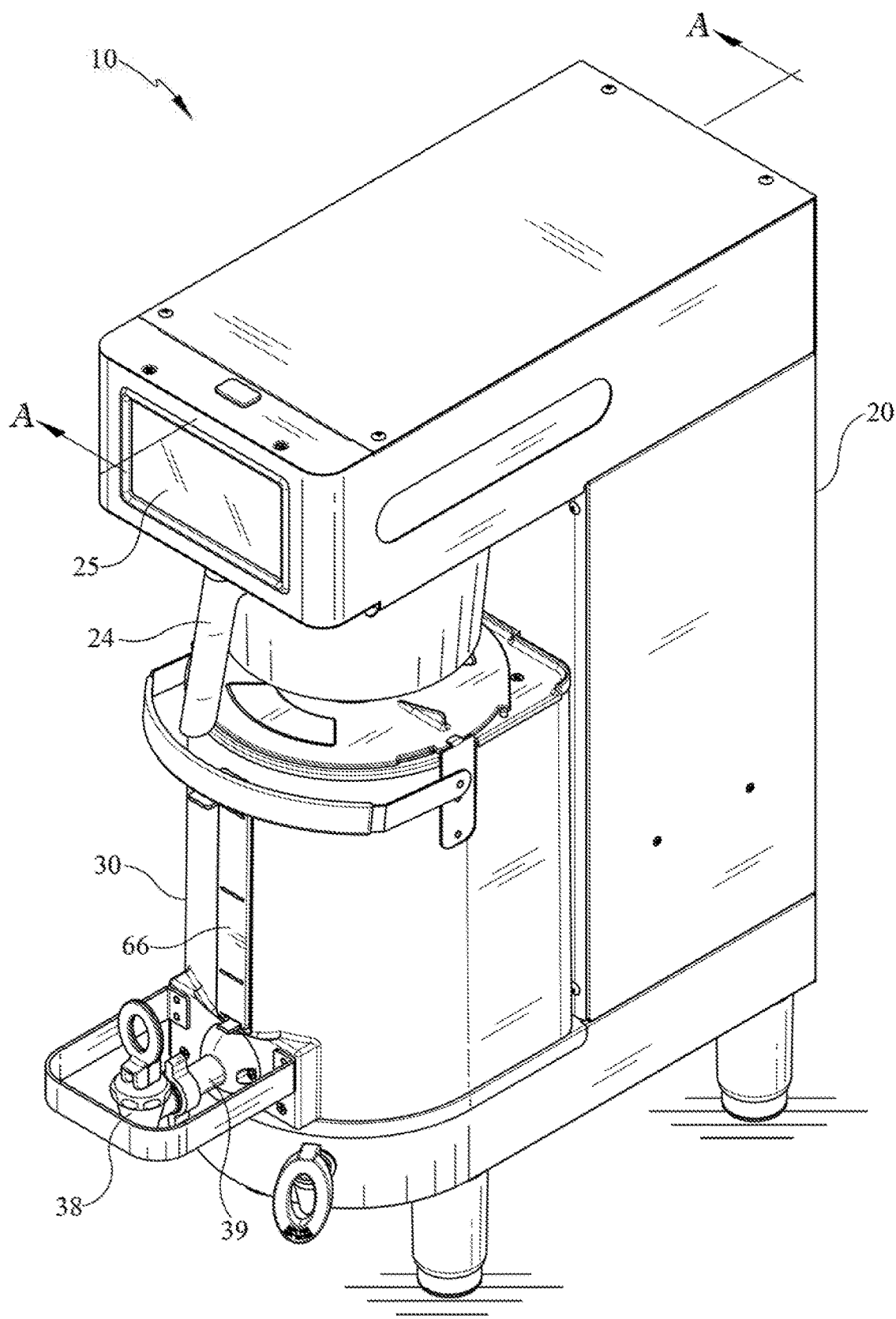
FIG. 1 is a perspective view of an exemplary satellite brewing system, including a portable beverage dispensing container made in accordance with the present invention.
Figure 2:
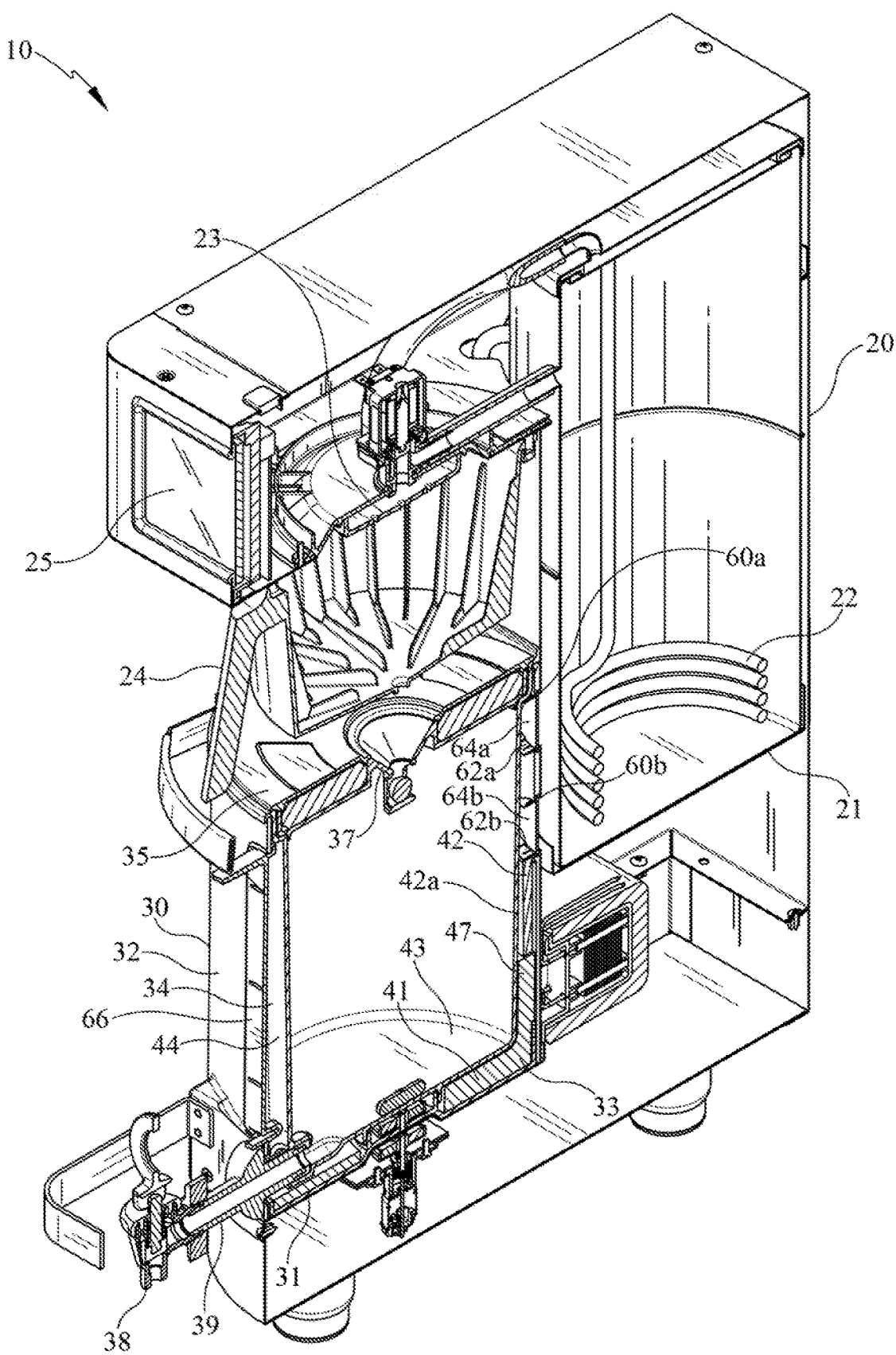
FIG. 2 is a sectional view of the exemplary satellite brewing system of FIG. 1, taken along line A-A of FIG. 1.
Figure 3:
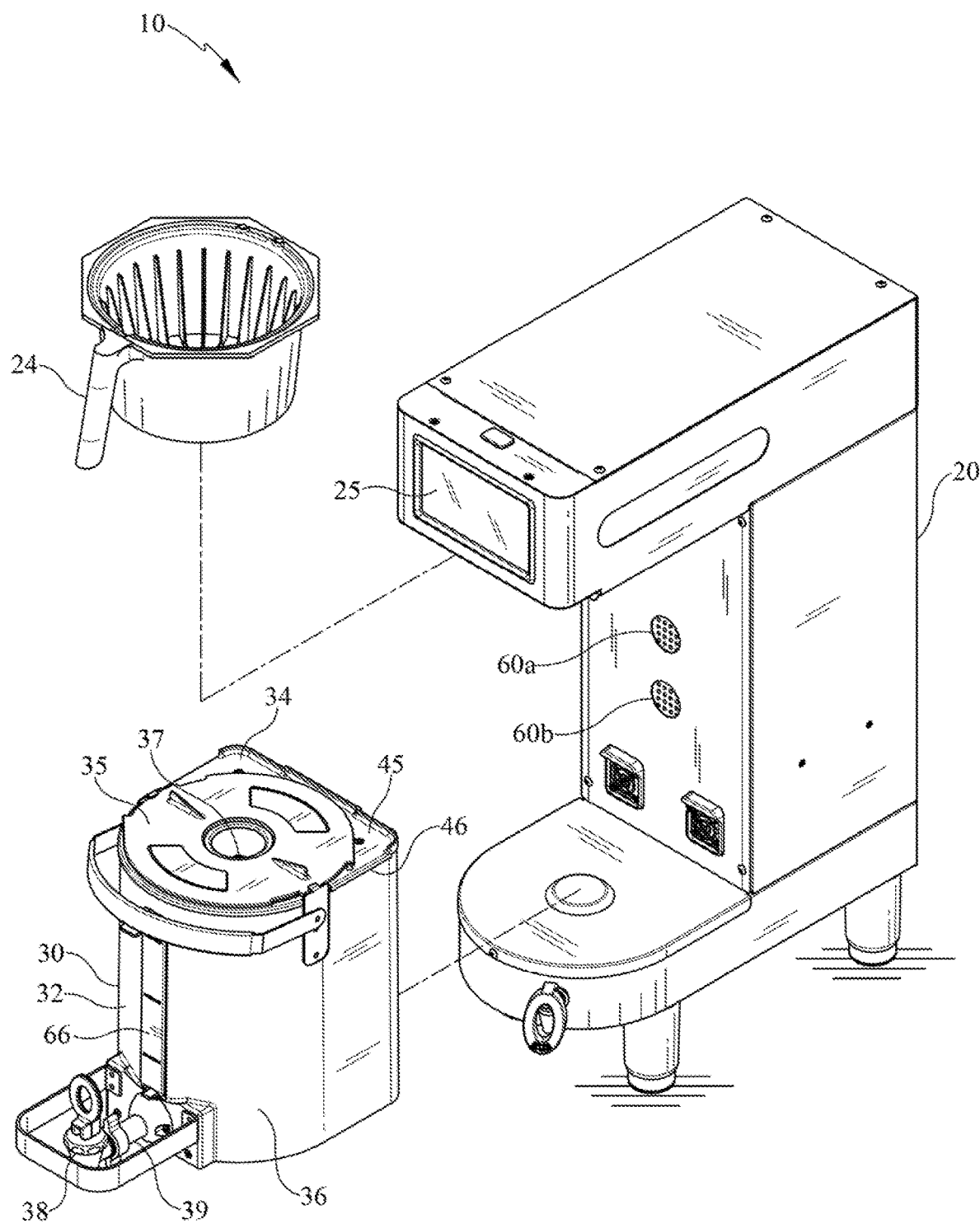
FIG. 3 is an exploded perspective view of the exemplary satellite brewing system of FIG. 1, showing the portable beverage dispensing container and brew basket separated from the brewing station.

As shown in FIGS. 1, 2 and 3, an exemplary satellite brewing system 10 made in accordance with the present invention generally comprises a brewing station 20 and a portable beverage dispensing container (or shuttle) 30. The shuttle 30 is selectively positioned under a brew basket 24 of the brewing station 20. As shown in FIG. 2, the brewing station 20 includes a water tank 21 (or reservoir) with a heater 22 configured to heat and maintain the water at a predetermined temperature. In use, a plumbing system of the brewing station 20 delivers the hot water from the water tank 21 to a spray head 23. The spray head 23 then delivers the hot water to the brew basket 24, introducing the hot water into the brew basket 24, such that the hot water contacts and passes through a quantity of ground coffee, tea, or other beverage component to produce a brewed beverage, which moves downward under the force of gravity and through a filter, pod, or other media (not shown) before being dispensed into the shuttle 30.

Figure 4:
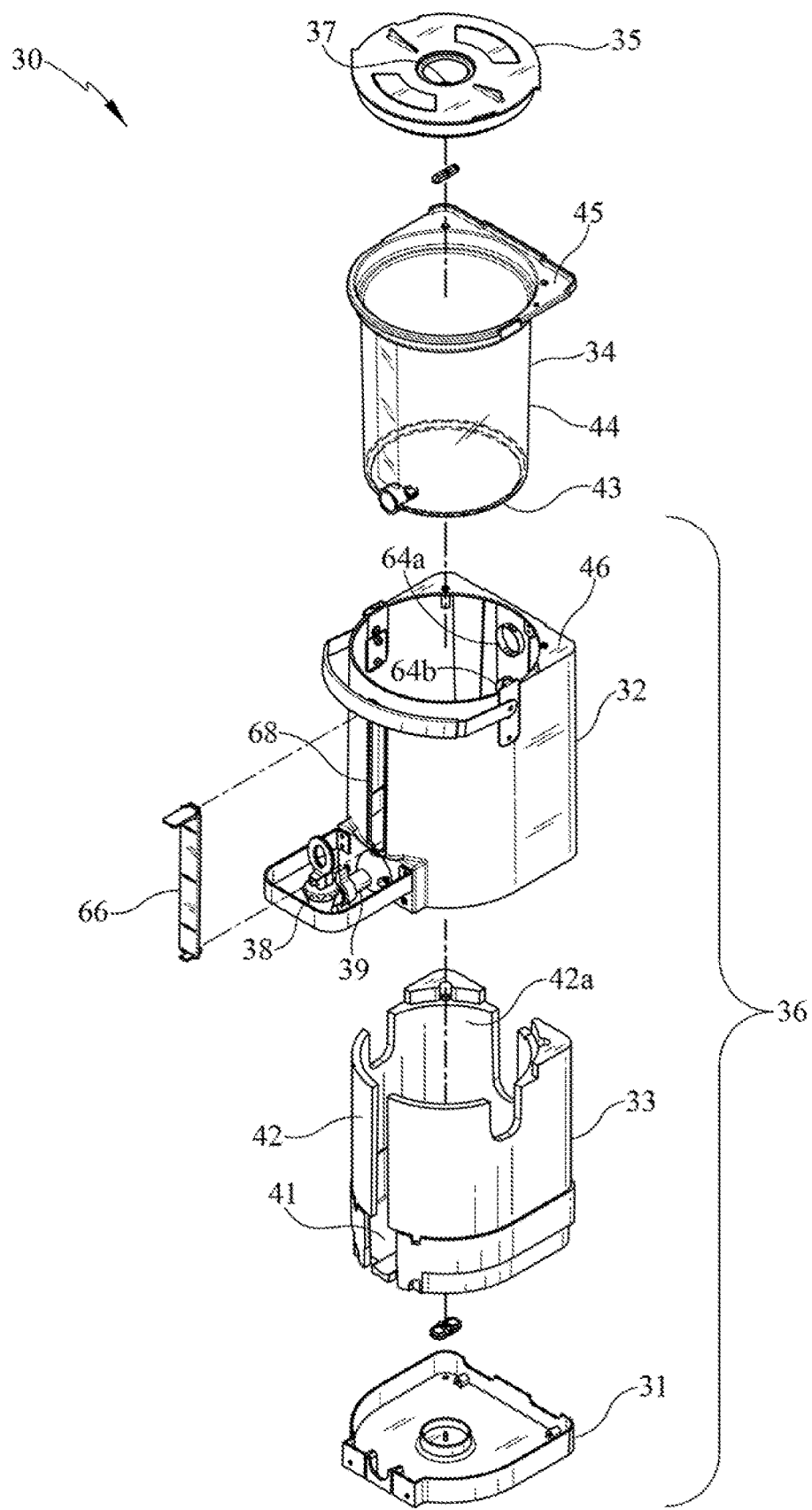
FIG. 4 is an exploded perspective view of the portable beverage dispensing container of the exemplary satellite brewing system of FIG. 1.

Referring still to FIGS. 1, 2, and 3, along with FIG. 4, the shuttle 30 includes a housing 36 with an internal beverage holding tank 34 (or liner) positioned in and contained within the housing 36. In this exemplary embodiment, and as perhaps best shown in FIG. 4, the housing 36 includes: a main body member 32, which substantially forms the sides of the housing 36; a bottom member 31, which substantially forms the bottom surface of the housing 36; and an insulating insert 33 contained substantially within the main body member 32. The bottom member 31 is removably secured to the main body member 32, so that the insulating insert 33 can be positioned and secured within the housing 36 around the internal beverage holding tank 34, as further discussed below.

Specifically, in this exemplary embodiment, the insulating insert 33 includes a bottom wall 41 and a circumferential side wall 42, which define a generally cylindrical internal cavity 42a. The internal beverage holding tank 34 has a generally cylindrical shape with a bottom wall 43 and a circumferential side wall 44. However, the internal beverage holding tank 34 is sized such that, when the internal beverage holding tank 34 is positioned in and contained within the housing 36, the bottom wall 43 of the internal beverage holding tank 34 is at a spaced distance from the bottom wall 41 of the insulating insert 33. Similarly, the exterior surface of the side wall 44 of the internal beverage holding tank 34 is at a spaced distance from the inner surface of the side wall 42 of the insulating insert 33.

Regardless of the particular construction of the housing 36, as mentioned above, the internal beverage holding tank 34 is positioned in and contained within the housing 36. In this exemplary embodiment, an upper flange 45 of the internal beverage holding tank 34 engages an upper surface 46 of the main body member 32 of the housing 36, thus maintaining the position of the internal beverage holding tank 34 relative to the housing 36. A lid 35 is selectively positioned over the top of the internal beverage holding tank 34, with an opening 37 defined in the lid 35, through which the brewed beverage is directed from the brew basket 24 into the internal beverage holding tank 34. Brewed beverage stored in the internal beverage holding tank 34 can then be dispensed through a dispensing nozzle 38 on the external surface of the housing 36, which is in fluid communication with the internal beverage holding tank 34 via a delivery tube 39.

Referring now to FIGS. 1-6, in this exemplary satellite brewing system 10, there is a "virtual sight glass" that provides a visual indication of the level of the beverage in the shuttle 30 when it is positioned at the brewing station 20, along with a visual indication of the status of the brewed beverage.

Specifically, and as perhaps best shown in FIG. 3, the brewing station 20 includes a light source. In this exemplary embodiment, the light source is actually comprised of first and second light sources 60a, 60b, which are vertically aligned, and each of which includes multiple light-emitting diodes (LEDs). Of course, other types of light sources and alternate arrangements of the light sources are contemplated and could be incorporated into the brewing station 20 without departing from the spirt and scope of the present invention.

Figure 5:
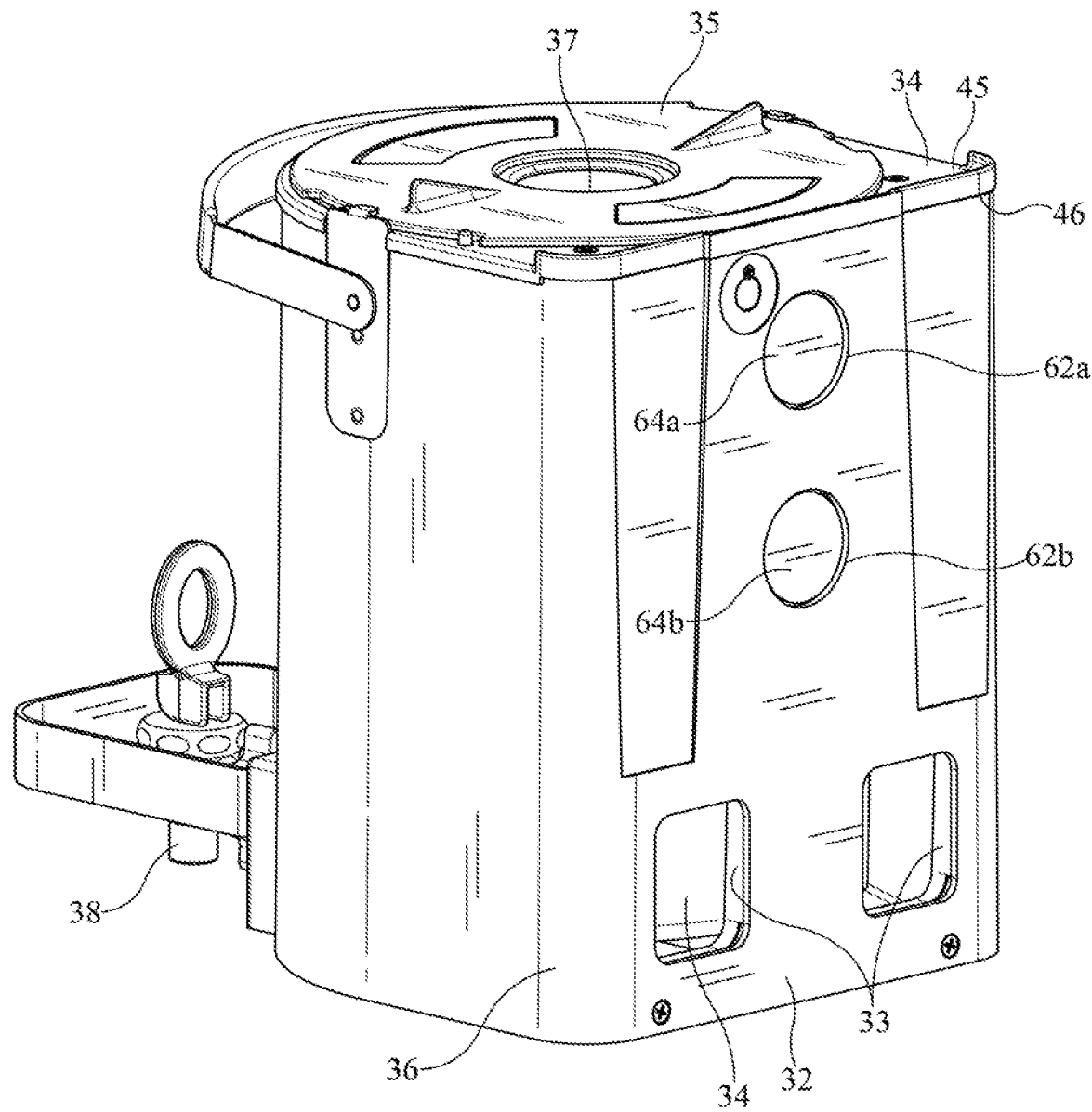
FIG. 5 is a rear perspective view of the portable beverage dispensing container of the exemplary satellite brewing system of FIG. 1.
Figure 6:
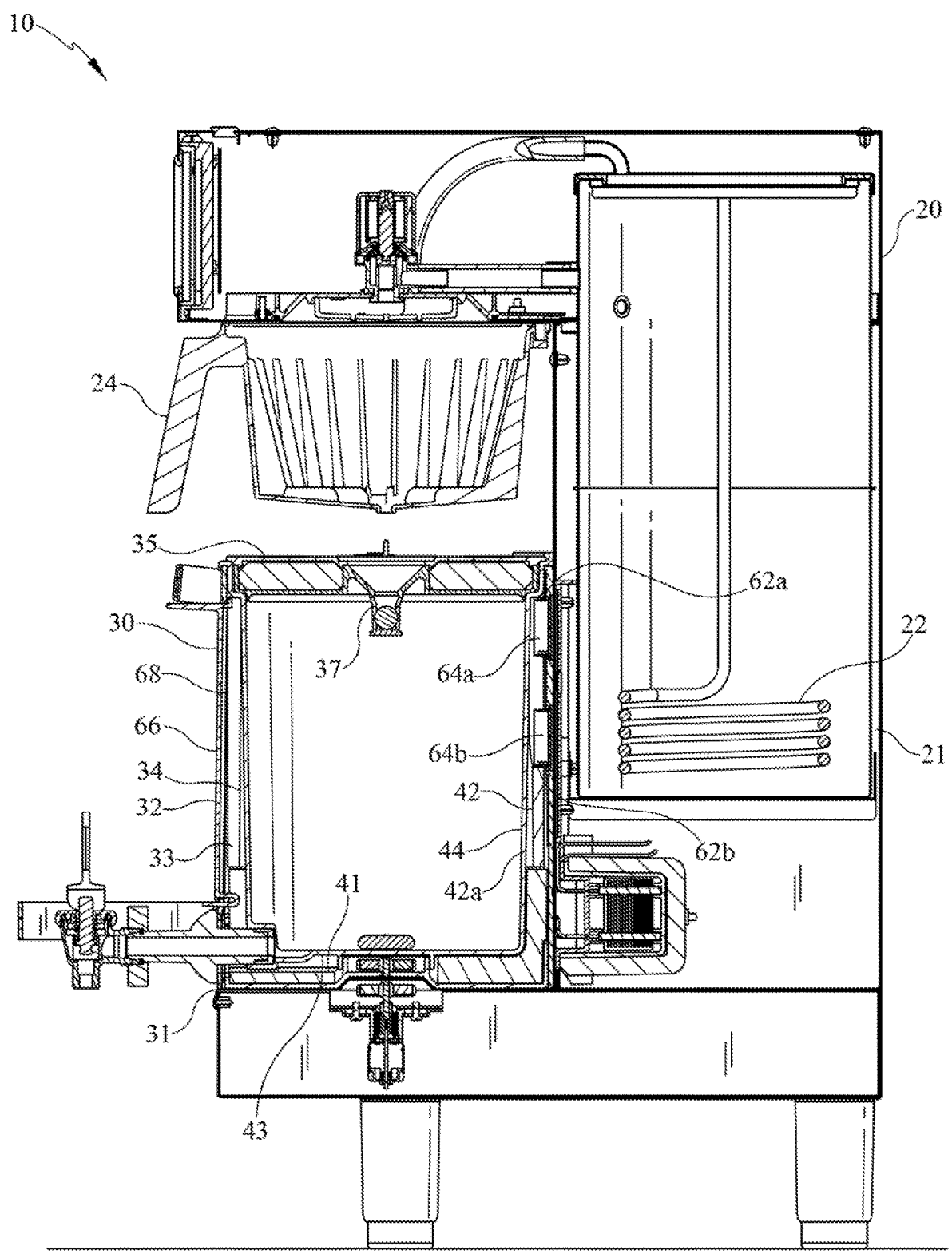
FIG. 6 is a sectional view of the exemplary satellite brewing system of FIG. 1, taken along line A-A of FIG. 1.

Referring now to FIGS. 4, 5, and 6, the housing 36 of the shuttle 30 includes first and second openings 62a, 62b, which, in this exemplary embodiment, are defined through a rear surface of the housing 36 of the shuttle 30. More specifically, each opening 62a, 62b is defined through both the main body member 32 and the insulating insert 33 of the housing 36 of the shuttle 30. Each opening 62a, 62b corresponds to a position of a respective light source 60a, 60b, and, in this exemplary embodiment, each opening 62a, 62b is provided with an insert 64a, 64b constructed from a translucent plastic or similar material. For purposes of the present application, a "translucent" material is intended to identify a material that allows light to pass through it, irrespective of the existence or degree of diffusion or scattering of the light. Thus, when the shuttle 30 is positioned at the brewing station 20, light emitted from the light sources 60a, 60b is directed through the openings 62a, 62b defined through the rear surface of the housing 36 of the shuttle 30.

Referring still to FIGS. 4, 5, and 6, the internal beverage holding tank 34 is also constructed from a translucent material, including, for example, glass. Thus, light directed through the openings 62a, 62b in the housing 36 of the shuttle 30 continues through the wall of the internal beverage holding tank 34, which contains a variable level of beverage. Light that is above the level of the beverage contained in the internal beverage holding tank 34 will then travel through and out the other side of the internal beverage holding tank 34. Light that is below the level of the beverage will be substantially absorbed by the beverage.

As shown in FIGS. 1, 2, 3, 4, and 6, on the front surface of the shuttle 30, there is a translucent sight glass window 66 that is installed in a corresponding front opening 68 defined through the front surface of the housing 36 of the shuttle 30. More specifically, the front opening 68 is defined through both the main body member 32 and the insulating insert 33 of the housing 36 of shuttle 30. Since light that is above the level of the beverage has travelled through the internal beverage holding tank 34, while light that is below the level of the beverage has been substantially absorbed by the beverage, the result is a light pattern projected on the sight glass window 66 that provides a visual indication of the level of the beverage in the shuttle 30, i.e., a lower dark region that is indicative of the level of the beverage in the internal beverage holding tank and an upper light region that is indicative of the unfilled portion of the internal beverage holding tank 34. Of course, markings or indicia could be included on or adjacent to the sight glass window 66 to equate the visual indication to volume measurements.

Although not shown, in some embodiments, the shuttle 30 could include openings defined through a top or other surface of the housing 36, such that light could be directed into the internal beverage holding tank 34 from another direction, without departing from the spirit and scope of the present invention.

Figure 7:
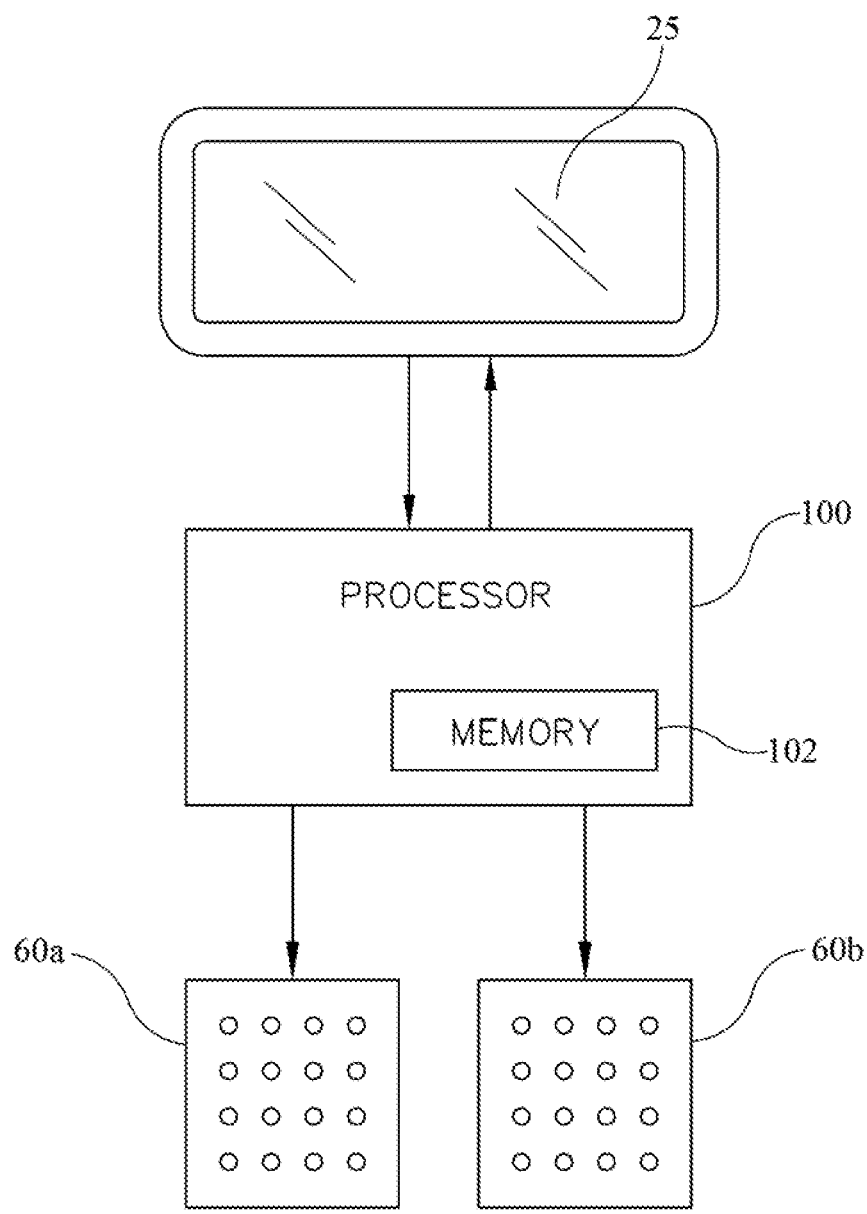
FIG. 7 is a simplified schematic view that illustrates the control of the light sources in one exemplary implementation.

FIG. 7 is a simplified schematic view that illustrates the control of the first and second light sources 60a, 60b in one exemplary implementation. Again, as described above (and also shown in FIG. 3), each of the first and second light sources 60a, 60b is comprised of multiple LEDs (or an array of LEDs). Referring still to FIG. 7, each of the first and second light sources 60a, 60b is operably connected to a processor 100, which includes a memory component 102. This processor 100 could be a discrete component or integrated into the control board that controls the brewing and other operations of the brewing system 10.

Furthermore, in this exemplary implementation, the processor 100 is operably connected to a display 25. As shown in FIGS. 1, 2, and 3, the display 25 is located on a front surface of the brewing station 20 in order to provide information regarding the operation of the satellite brewing system 10 to a user and/or to serve as an input means for the user to input instructions and control operation of the satellite brewing system 10.

Now, to ensure the quality of the brewed beverage, it is often important that the brewed beverage only be retained in the shuttle 30 for a certain time period (which may be referred to as "freshness time") before it is discarded. Therefore, in at least some embodiments of the present invention, the "virtual sight glass" is not only used to provide a visual indication of the level of the beverage in the shuttle 30 when it is positioned at the brewing station 20, but is also used to provide visual indication of the status of the brewed beverage.

In one exemplary implementation, during a brewing cycle, the processor 100 provides a control signal to the first and second light sources 60a, 60b to provide illumination of a first color (e.g., red).

Once the brewing cycle has been completed, the processor 100 provides a control signal to the first and second light sources 60a, 60b to provide illumination of a second color that is different than the first color (e.g., green).

The processor 100 is further programmed to monitor the elapsed time after the completion of a brewing cycle. Once the elapsed time has exceeded a first predefined threshold, the processor 100 provides a control signal to the first and second light sources 60a, 60b to provide illumination of a third color that is different than the first color and the second color (e.g., yellow). In this regard, the predefined threshold may be set at a percentage of the freshness time that has been established for the brewed beverage. For example, if the freshness time is 240 minutes (after completion of a brewing cycle), the predefined threshold may be 192 minutes, or 80% of the freshness time. In this regard, it is contemplated that, in at least some embodiments, the desired freshness time and/or the predefined threshold can be established by a user via the display 25, with that information then stored in the memory component 102 associated with the processor 100.

Finally, once the elapsed time has exceeded the freshness time, the processor 100 provides a control signal to the first and second light sources 60a, 60b to provide illumination of a fourth color. This fourth color could be the same as the first color (e.g., red) or a different color altogether.

As a further refinement, in some embodiments, each light source 60a, 60b (or selected LEDs) could be illuminated and/or pulsed at varying rates to indicate the status of the satellite brewing system 10. Furthermore, each light source 60a, 60b (or selected LEDs) could be illuminated and/or pulsed at varying rates to indicate certain error conditions or defective components.

As a further refinement, it is contemplated that, in some embodiments, the brewing station 20 includes a proximity switch (for example, a reed switch) which detects whether the shuttle 30 is positioned at the brewing station 20. When the shuttle 30 is positioned at the brewing station 20, the proximity switch closes, activating the first and second light sources 60a, 60b and turning on the "virtual sight glass." Likewise, when the shuttle 30 is not so positioned at the brewing station 20, the proximity switch is open, and the first and second light sources 60a, 60b will not operate. Additionally, if the proximity switch indicates the absence of the shuttle 30 when a user is trying to brew a beverage, one or both of the first and second light sources 60a, 60b could also be used to alert the user to place the shuttle 30 in position.

It should also be recognized that the first and second light sources 60a, 60b and all electronics and controls associated with the first and second light sources 60a, 60b would be installed in the brewing station 20, not the shuttle 30. Thus, the shuttle 30 could be completely submerged for cleaning without risk of damaging any electronics.

One of ordinary skill in the art will recognize that additional embodiments and implementations are possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the present invention.

What is claimed is:

1. A satellite brewing system, comprising:
a brewing station for producing a beverage; and
a shuttle that is selectively positioned at the brewing station to receive the beverage, the shuttle including a housing and an internal beverage holding tank constructed from a translucent material which is positioned in and contained within the housing;
wherein the brewing station includes a light source operably connected to a processor;
wherein the housing of the shuttle includes an opening defined through a surface thereof, such that light from the light source is directed through the opening and through the internal beverage holding tank;

wherein the housing of the shuttle further includes a translucent sight glass window on its front surface, with a light pattern projected on the translucent sight glass window that results from light that has passed from the light source and through the internal beverage holding tank; and wherein the processor provides a control signal to the light source to illuminate the light source based on a status of the beverage.

2. The satellite brewing system as recited in claim 1, wherein the light source is comprised of multiple light-emitting diodes.

3. The satellite brewing system as recited in claim 1, wherein the light source comprises first and second light sources, and wherein the housing of the shuttle includes first and second openings defined through a rear surface thereof, with each of the first and second openings corresponding to a position of a respective one of the first and second light sources.

4. The satellite brewing system as recited in claim 3, wherein the first light source is comprised of multiple light-emitting diodes, and wherein the second light source is comprised of multiple light-emitting diodes.

5. The satellite brewing system as recited in claim 1, and further comprising a display located on the front surface of the brewing station and operably connected to the processor in order to provide information regarding operation of the satellite brewing system to a user and to serve as an input means for the user to input instructions.

6. A satellite brewing system, comprising:

a brewing station for producing a beverage; and a shuttle that is selectively positioned at the brewing station to receive the beverage, the shuttle including a housing and an internal beverage holding tank constructed from a translucent material which is positioned in and contained within the housing;

wherein the brewing station includes a light source operably connected to a processor;

wherein the housing of the shuttle includes an opening defined through a surface thereof, such that light from the light source is directed through the opening and through the internal beverage holding tank;

wherein the housing of the shuttle further includes a translucent sight glass window on its front surface, with a light pattern projected on the translucent sight glass window that results from light that has passed from the light source and through the internal beverage holding tank;

wherein the processor provides a control signal to the light source to illuminate the light source (i) to provide illumination of a first color during a brewing cycle, and (ii) to provide illumination of a second color that is different than the first color upon completion of the brewing cycle; and wherein the illumination of the first color or the illumination of the second color is visible as part of the light pattern projected on the translucent sight glass window.

7. The satellite brewing system as recited in claim 6, wherein the processor is programmed to monitor an elapsed time after the completion of the brewing cycle and provides a control signal to the light source to illuminate the light source to provide illumination of a third color that is different than the first color and the second color when the elapsed time exceeds a first predefined threshold.

8. The satellite brewing system as recited in claim 7, wherein the first predefined threshold is a percentage of an established freshness time for the beverage.

9. The satellite brewing system as recited in claim 7, wherein the light source is comprised of multiple light-emitting diodes.

10. The satellite brewing system as recited in claim 7, wherein the light source comprises first and second light sources, and wherein the housing of the shuttle includes first and second openings defined through a rear surface thereof, with each of the first and second openings corresponding to a position of a respective one of the first and second light sources.

11. The satellite brewing system as recited in claim 10, wherein the first light source is comprised of multiple light-emitting diodes, and wherein the second light source is comprised of multiple light-emitting diodes.

12. The satellite brewing system as recited in claim 7, and further comprising a display located on the front surface of the brewing station and operably connected to the processor in order to provide information regarding operation of the satellite brewing system to a user and to serve as an input means for the user to input instructions.

* * * * *